United States Patent [19]
Kuhns

[11] Patent Number: 5,336,035
[45] Date of Patent: Aug. 9, 1994

[54] HAY BALE BASKET

[75] Inventor: Abe B. Kuhns, Arthur, Ill.

[73] Assignee: E-Z Trail, Inc., Arthur, Ill.

[21] Appl. No.: 983,268

[22] Filed: Nov. 30, 1992

Related U.S. Application Data

[63] Continuation of Ser. No. 679,763, Apr. 3, 1991, abandoned.

[51] Int. Cl.⁵ .............................................. B65G 67/04
[52] U.S. Cl. .................................. 414/501; 298/23 R;
 298/23 A; 296/56; 280/33.991; 414/111;
 414/519; 414/789.7
[58] Field of Search .................. 298/23 R, 23 S, 23 A,
 298/23 F, 23 D, 23 DF; 414/472, 501, 502, 503,
 504, 505, 507, 519, 520, 789.7, 111, 132;
 280/33.991, 33.998; 296/56, 50, 183, 184;
 56/324, 324.5, 322

[56] References Cited

U.S. PATENT DOCUMENTS

| | | |
|---|---|---|
| 1,635,905 | 7/1927 | Poth ........................ 298/23 F X |
| 3,123,239 | 3/1964 | Shoemake et al. ............ 298/23 A X |
| 3,229,834 | 1/1966 | Dodd et al. . |
| 3,472,548 | 10/1969 | Comisac ..................... 296/56 X |
| 4,909,698 | 3/1990 | Martin ....................... 414/519 X |

FOREIGN PATENT DOCUMENTS

| | | |
|---|---|---|
| 1455451 | 12/1968 | Fed. Rep. of Germany ........ 296/56 |
| 1755242 | 6/1978 | Fed. Rep. of Germany ........................ 280/33.991 |
| 6410759 | 9/1965 | Netherlands .................... 280/33.991 |

OTHER PUBLICATIONS

U.S. Published Application 184,650 Nelson—May 28, 1918.
Egebjerg Maskinfabrik AS, 3 *Typer Egebjerg halmballervogne, indarbejdet siden* 1971.
Egebjerg Maskinfabrik AS, *Prisliste pr.* Jan. 11, 1980.

*Primary Examiner*—Frank E. Werner
*Attorney, Agent, or Firm*—Lockwood, Alex, FitzGibbon & Cummings

[57] ABSTRACT

A mobile basket for accumulating and transporting hay bales includes a container mounted on wheels. The container has a pair of side walls which are spaced from each other and the spacing is greater at the rear of the container than at the front thereof. A rear wall of the container is hinged at its top and opens by gravity to discharge the bales from the container. A chute is also provided at the front of the container to receive hay bales directly from a hay baler and discharge them to the container. The rear wall may be opened and shut remotely, and a plurality of the containers may be readily nested with relation to each other for shipment.

25 Claims, 3 Drawing Sheets

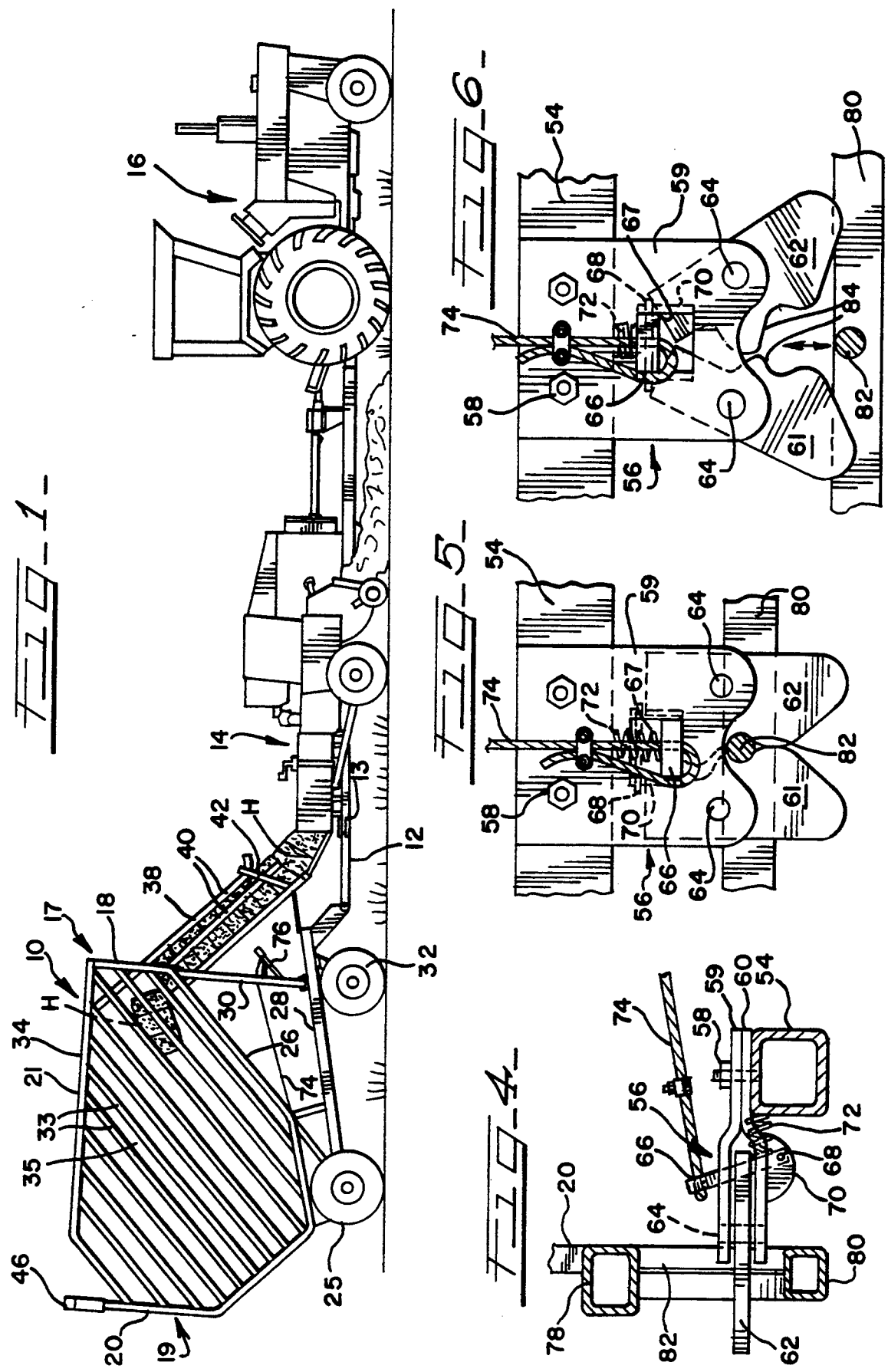

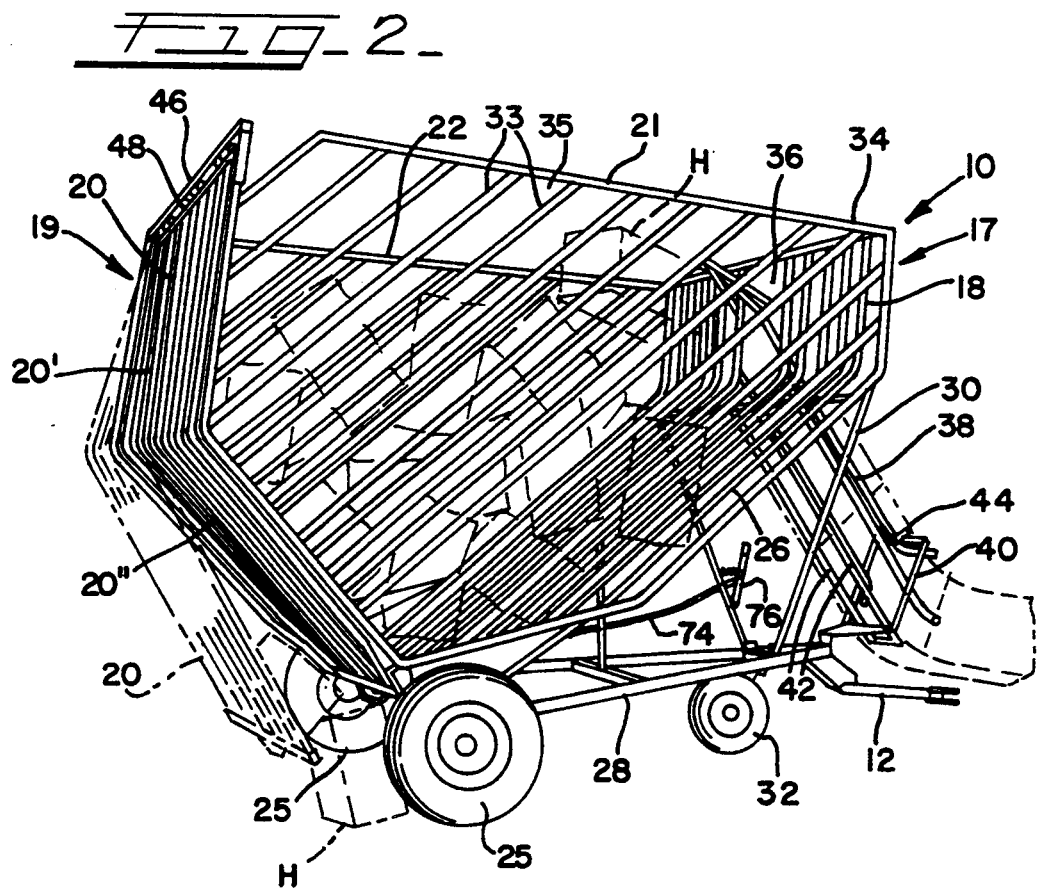
FIG-2-
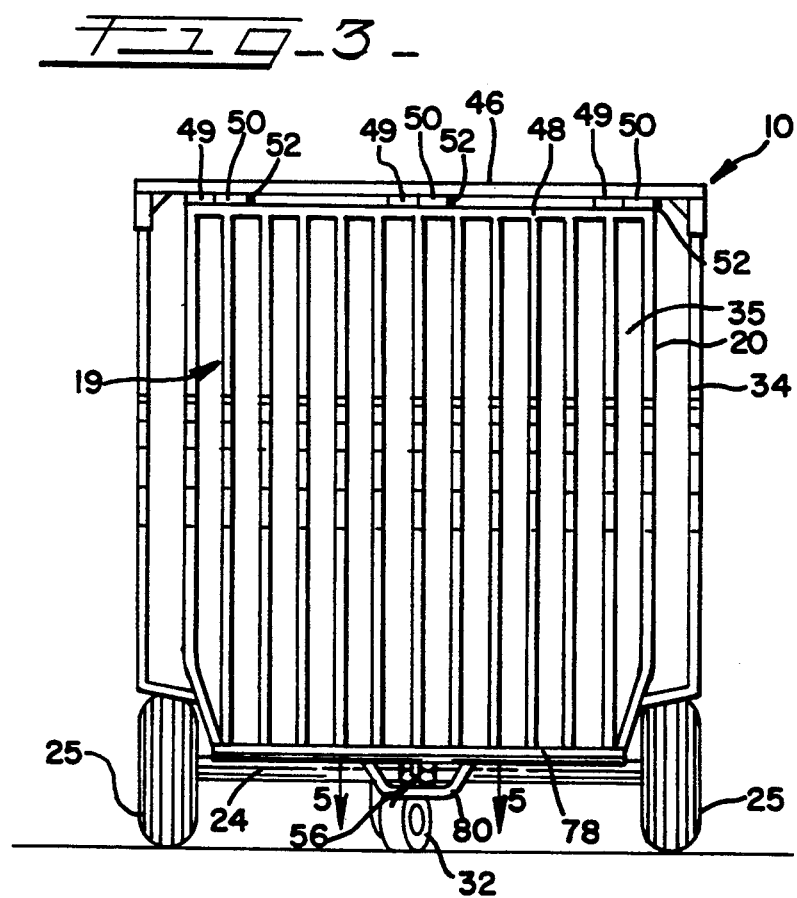
FIG-3-

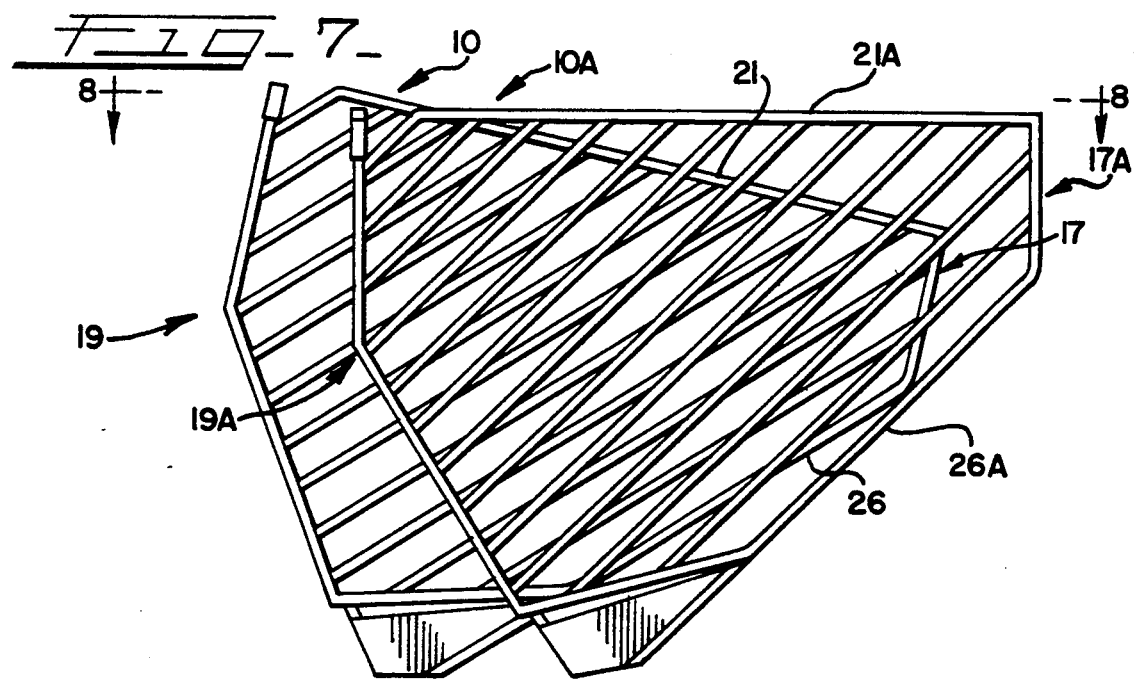
FIG_7_
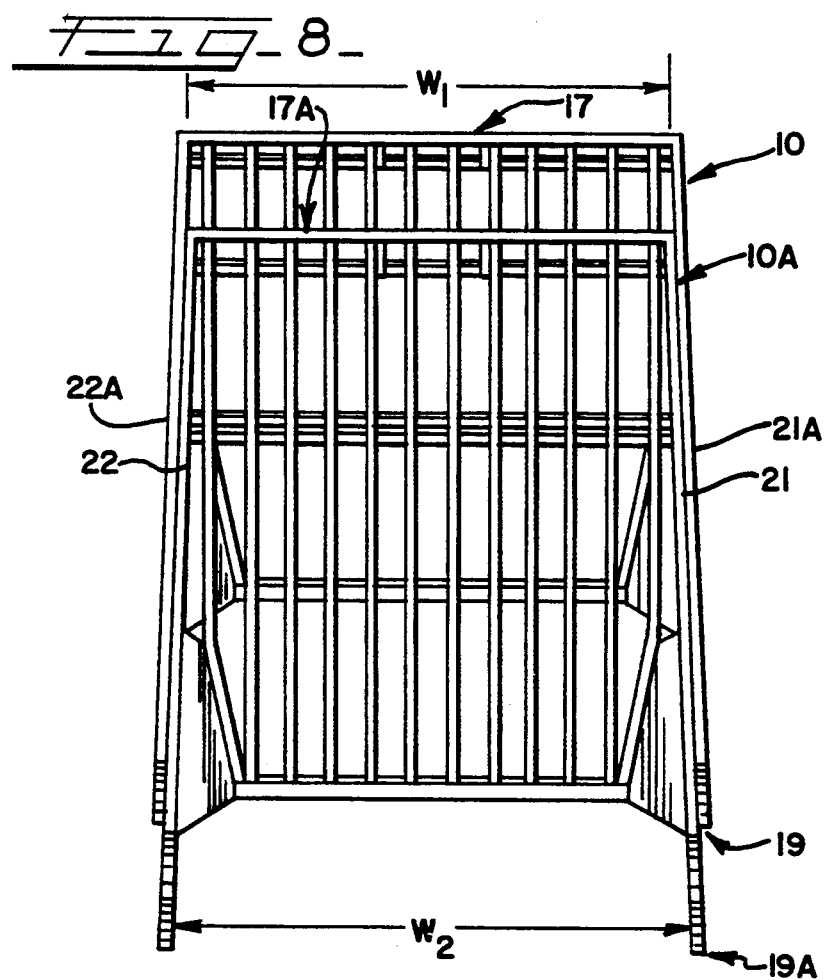
FIG_8_

HAY BALE BASKET

This application is a continuation of application Ser. No. 07/679,763, filed Apr. 3, 1991, now abandoned.

BACKGROUND AND SUMMARY OF THE INVENTION

The present invention relates to a hay bale basket and, more particularly, to a mobile basket for receiving bales of hay in the field from a hay baler, transporting the bales from the field to a desired storage location, and discharging the bales at that location.

Hay bale baskets of a general nature in one form or another have been utilized in agriculture for decades for the aforementioned purposes. Such hay bale baskets have been either filled directly from a hay baler as the bales are formed in the field, or they are drawn through the field in conjunction with a mechanism which picks up and throws bales into the basket which have already been formed and have been left deposited in the field. When the basket has been filled, it is drawn by a tractor or other vehicle from the field to the location at which the bales are to be deposited, and there the bales are dumped from the basket.

The prior hay bale baskets suffer from a number of disadvantages. Where the basket has been employed with a bale thrower which picks the already formed bales from the field to throw them into the basket, impact forces on the basket have resulted in bending or damage to the basket. Moreover, the bale throwers themselves constitute an additional piece of equipment which poses an added expense to the bale collection process, and which is prone to mechanical problems.

The hay bale basket of the present invention is preferably coupled directly to the baler which forms the bales in the field, and receives the bales immediately as they are formed, and the bales are collected in the basket without throwing. Thus, the bale basket of the present invention obviates the need for the separate thrower equipment with its attendant disadvantages, and also the additional steps of first depositing the bale in the field and then retraversing the field later in a separate step to pick up the formed bales for transport to their storage location.

Hay bale baskets of this nature, i.e. which are adapted to receive bales directly from a hay baler, have also been known in the agricultural industry for decades. However, most if not all of these prior hay bale baskets—either those of the type used in association with bale throwers or used directly with the hay baler—also suffer several additional disadvantages. One such disadvantage is that because their walls generally take the form of an open basket or cage-like structure, bales frequently become lodged in the wall openings and/or wedged against each other, thereby impairing both the easy and complete filling of the bale basket, or the rapid, complete and organized unloading of the basket at the location at which the bales are to be ultimately deposited. The present invention overcomes those problems simply and efficiently.

Another disadvantage of the prior hay bale baskets is that the baskets have not generally been susceptible to assembly by the manufacturer because the assembled baskets are difficult to ship in quantity due to their bulky size. Accordingly, they are usually shipped as a large number of individual parts and initial assembly usually takes place at the site of the dealer or ultimate user. That assembly frequently requires up to two man days for each basket. Unlike these prior hay bale baskets, the major components of the hay bale basket of the present invention may be preassembled at a manufacturing facility where appropriate personnel, equipment and tools are available, and these large preassembled subassemblies may be easily stacked for shipment in quantities to the final assembly location and assembly may be completed there by as few as two men in about 30 minutes.

Also in the present invention, a latching assembly is provided for the rear wall of the hay bale basket which permits it to be remotely actuated to swing open by gravity to dump the bales from the basket, and may be relatched shut simply by movement of the bale basket. Thereby, discharge of the bales is readily facilitated and possible injury to personnel is minimized because personnel do not have to be positioned adjacent the rear wall or its discharge at any time.

In one principal aspect of the present invention, a mobile basket for accumulating and transporting hay bales comprises an axle supported on wheels and a container mounted upon and supported by the axle for the transport of the container. The container has a front and a rear, and a pair of side walls which are spaced from each other to define the container. The side walls have a cage-like structure with openings of substantial size therethrough. A bottom wall on the container slopes upwardly from adjacent the axle toward the front of the container, and a rear wall is on the rear of the container. Hinge means hinges the rear wall adjacent its top to the container and such that the rear wall swings between a shut position to retain the bales in the container and an open position by gravity to discharge the bales from the container. The spacing of the cage-like side walls is greater at the rear of the container than at the front thereof.

In another principal aspect of the present invention, an elongate chute is mounted to the front of the container and slopes downwardly and forwardly therefrom. The chute has an inlet end positioned to receive bales from a hay baler and a discharge end positioned to discharge the bales in the chute to the container.

In still another principal aspect of the present invention, the container has a front wall at its front and adjacent its top and the aforementioned chute is mounted to the front wall.

In still another principal aspect of the present invention, the aforementioned chute has a latch adjacent its inlet end to retain bales in the chute.

In still another principal aspect of the present invention, a castor wheel is positioned adjacent the front of the container.

In still another principal aspect of the present invention, latch means is positioned adjacent the aforementioned rear wall, and latch operating means unlatches the latch means from a location remote from the latch means to permit the rear wall to swing from its shut position to its open position.

In still another principal aspect of the present invention, at least a portion of the rear wall is inclined relative to the vertical when the rear wall is in its shut position, whereby the rear wall will swing to its open position by gravity about its hinge means.

In still another principal aspect of the present invention, the aforementioned inclined rear wall will also swing to its shut position and be latched therein by the latch means by movement of the mobile basket.

In still another principal aspect of the present invention, the aforementioned side walls comprise a plurality of spaced parallel tubular members sloping upwardly from the rear wall toward the front of the container, the spacing between the tubular members defining the aforementioned openings of substantial size.

In still another principal aspect of the present invention, the aforementioned bottom wall also has a cage-like structure with openings of substantial size therethrough.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 1 is a side elevation view of a hay bale basket constructed in accordance with the principles of the present invention and shown in operation in the field in conjunction with a conventional hay baler and tractor;

FIG. 2 is a rear perspective view of the hay bale basket shown in FIG. 1;

FIG. 3 is a rear elevation view of the hay bale basket shown in FIG. 2;

FIG. 4 is a cross sectioned, side elevation view of a preferred embodiment of latching mechanism for the rear wall of the hay bale basket of the present invention;

FIGS. 5 and 6 are broken plan views of the latching mechanism substantially as shown in FIG. 4 and in which the rear wall of the hay bale basket is latched and being unlatched, respectively, with FIG. 5 being viewed substantially along line 5—5 of FIG. 3;

FIG. 7 is a side elevation view of two partially assembled hay bale baskets constructed in accordance with the principles of the present invention and in which they are stacked for transport to their final assembly destination; and FIG. 8 is a plan view of the partially assembled, stacked baskets, as viewed substantially along lines 8—8 of FIG. 7.

DESCRIPTION OF THE PREFERRED EMBODIMENT

A preferred embodiment of mobile hay bale basket 10 constructed in accordance with the principles of the present invention is shown in the drawings. As shown in FIG. 1, the bale basket 10 is adapted to be drawn by a tongue 12 from a rear hitch 13 on a conventional hay baler 14. The hay baler 14, in turn may be drawn by a tractor 16 in the field.

With reference in particular to FIGS. 1-3, the hay bale basket has a front 17 having a front wall 18, a rear 19 having a rear wall 20, and a pair of spaced side walls 21 and 22 extending between the front and rear walls. The basket 10 also includes an axle 24, as best seen in FIG. 3, with the axle having a pair of spaced tires or wheels 25 at each end for supporting the hay bale basket. The basket 10 also includes a bottom wall 26 which slopes upwardly from the axle 24 to the front wall 18, as best seen in FIGS. 1 and 2. The front wall 18, rear wall 20, spaced side walls 21 and 22, and sloped bottom wall 26 thereby define a container basket for receiving, transporting and discharging bales of hay H as seen in FIGS. 1 and 2.

This basket container is mounted on the axle 24 for transport thereon and also on a frame 28 having typical angled support struts 30 for supporting the front 17 of the basket. A castor wheel 32 is also preferably mounted on the frame 28 adjacent the front 17 of the bale basket and the struts 30 for supporting the front of the basket and permitting the entire bale basket assembly to readily turn both in and out of the field.

The front wall 18, rear wall 20, side walls 21 and 22, and sloped bottom wall 26 are in the form of a cage-like structure or basket having openings of substantial size therein. As shown in the drawings, these walls are preferably formed by tubular members or pipes 33 which extend in spaced parallel relationship to each other and in a generally upward direction from the rear 19 toward the front 17. The pipes 33 are fixed at their ends, as by welding, between a perimeter frame 34 to form these walls. Due to the spacing between the tubular members 33, openings 35 of substantial size are present between the tubular members. This construction is preferred because it is both strong as well as light weight, and the degree of fill of the bale basket can be visually observed at all times during use.

As best seen in FIG. 2, the front wall 18 contains a bale inlet opening 36. A bale chute 38 is attached to the front wall 18 so that its upper end discharges through the bale inlet opening 36 into the basket. From the front wall 18 the bale chute 38 slopes downwardly to a lower bottom chute inlet 40 which may be positioned adjacent the discharge of the hay baler 14 to receive the hay bales H. The bale chute 38 also is preferably formed of longitudinally extending pipes 42. A latch 44, as seen in FIG. 2, which may take any number of forms, is positioned adjacent the chute inlet 40. The purpose of the latch 44 is to permit the bales to readily enter the chute 38 from the inlet 40, but be able to pivot or otherwise move to prevent any of them which may be positioned in the chute from falling from the chute during transport.

Due to the openings 35 of substantial size defined between the basket pipes 33 in the side walls 21 and 22 and/or bottom wall 26 of the bale basket, bales sometimes would tend to become lodged or wedged in the openings both during the loading of the bales H into the bale basket, as well as during unloading. However, this lodging or wedging problem is avoided in the present invention by flaring the side walls 21 and 22 from the front wall 18 toward the rear 19 of the bale basket as best seen in FIG. 8. More specifically, as shown in FIG. 8, the width of the bale basket $w_1$ at its front 17 is less then the width $w_2$ at the rear 19 of the basket. For example, it has been found that where $w_1$ is 10 feet and $w_2$ is 11 feet, the tendency of the hay bales H to become lodged or wedged in the openings 35 and hung up in the basket during loading or unloading is avoided, and results in the free and ready discharge of the bales H, as well as minimizing their scatter at the unloading site.

The flared side walls also enjoy another important advantage. That is that they permit the manufacture of a major part of the bale basket at the manufacturer, rather than at the dealer or end user. This is because the preassembled basket subassemblies which already include the front wall 18, side walls 21 and 22 and bottom wall 26 may be stacked in closely nested relationship, as shown in FIGS. 7-8, and transported at the same time on a flat bed truck. In prior unflared baskets, if these elements were assembled at a primary manufacturer, only one or two units at most could be shipped on the same truck. However, with the flared cage-like baskets of the present invention, two or more basket subassemblies 10 and 10A may be easily nested or stored in the minimum of space as shown in FIGS. 7 and 8. Once the basket subassemblies 10 and 10A arrive at their final assembly site, all that needs to be done is to mount them on their axles 24, wheels 25, frames 28 and struts 30, hang the rear wall 20 and mount the bale chute 38. This can be done by two persons in about 30 minutes for each basket, as opposed to two persons for two days where the entire assembly must be put together on site. It will be understood that although only two baskets are shown in stacked relationship in FIGS. 7-8, many more may be so stacked.

A cross beam or pipe 46, as best seen in FIGS. 1 and 3, is preferably fixed to the top of the rear frame pipes 34 of the side walls 21 and 22 so as to extend transversely across the top of the rear 19 of the basket 10. The rear end wall 20 also has a cross pipe 48 extending transversely across its width at the top. A plurality of half-hinge cylinders 49 are fixed, as by welding, to the underside of the cross beam or pipe 46, and a plurality of half-hinge cylinders 50 are fixed, as by welding, to the topside of the cross pipe 48. The hinge cylinders 49 and 50 are hingedly mounted together in the fashion of a door hinge by hinge pins 52. Thus, the rear wall 20 of the basket is capable of hingedly swinging between a position to shut the basket, as shown in solid in FIG. 2, and a position to open the basket 10, as shown in dot and dash in FIG. 2.

Also as shown in FIG. 2, the rear wall 20 preferably includes a vertical portion 20' which extends in a generally vertical direction when the rear wall 20 is in its shut position, and a lower portion 20" which extends at an angle to the vertical when the rear wall 20 is in that position. The purpose of the double angled rear wall 20 will be described in further detail to follow.

Referring particularly to FIGS. 3-6, the frame 28 also includes a transverse cross beam 54 extending across the bale basket adjacent the bottom of the bottom wall 26. A latching assembly 56 is mounted to the cross beam as by bolts 58.

As best seen in FIGS. 4-6, the latching assembly 56 comprises a pair of plates 59 and 60 which are spaced from each other at their rearward ends to receive a pair of locking fingers 61 and 62 therebetween. The locking fingers are mounted to pivot relative to the plates 59 and 60 by pivot pins 64 extending between the plates and through the fingers. An actuating arm 66 vertically extends through a slot 67 in the plates 59 and 60 and is pivotally attached at its lower end to a pin 68 which extends between a pair of spaced flanges 70 fixed to the bottom side of the lower plate 60. The actuating arm 66 is loaded by a spring 72 so as to pivot in the counterclockwise direction, as viewed in FIG. 4, and between the ends of the locking fingers which are between the plates 59 and 60. When the actuating arm 66 is in this position, the locking fingers 61 and 62 are prevented from moving from the locking position as shown in FIG. 5.

A cable 74 or other tensioning mechanism is fixed to the top of the actuating arm 66 to draw it in the clockwise direction as viewed in FIG. 4 against the force of spring 72, and from between the ends of the locking fingers 61 and 62 which are between the plates 59 and 60 to permit the locking fingers to pivot to their open position as shown in FIG. 6. The cable 74 is preferably connected to a cable actuating lever 76 which, as shown in FIGS. i and 2, is located remotely from the rear wall 20.

The cable actuating lever 76 may be either mounted on the frame 28 or one of the struts 30, as shown in the drawings, or even to the tractor 16 when the bale basket is being transported to the location in which the bales are to be deposited. Thus, it will be seen that the rear wall 20 may be unlatched at a location remote from it to prevent accidental injury to the operating personnel.

The rear wall 20 also includes a bottom cross pipe or beam 78, as seen in FIGS. 3-6, with an open bracket structure 80 extending beneath the latching mechanism 56 and its locking fingers 61 and 62. A pin 82 is fixed, as by welding, between the cross pipe 78 and the bracket 80. The pin 82 is positioned between the locking fingers 61 and 62, as shown in FIG. 5, to latch the rear wall 20 in the shut position. When the fingers are released by drawing a tension on the cable 74, the weight of the rear wall 20 with its inclined bottom portion 20" will cause the rear wall to swing open by gravity with the pin 82 forcing the locking fingers 61 and 62 apart, as shown in FIG. 6, to unlatch the rear wall.

Once the rear wall 20 is unlatched and swings to its open position, the bales H in the bale basket 10 will be rapidly discharged into a compact organized pile. Further movement forward of the basket until the rear wall 20 clears the pile of bales will cause the rear wall to swing like a pendulum due to the inclined lower portion 20" with sufficient swinging motion so that the pin 82 will again move between the locking fingers 61 and 62. When the pin 82 moves back, it will strike cam surfaces 84 on the fingers, as shown in FIG. 6, to force the fingers together to relatch the pin 82 and the rear wall 20 in the shut position as shown in FIG. 5. Thus, the opening and shutting of the rear wall may be accomplished remotely and automatically without the need for the presence of personnel adjacent to this operation.

Although it is believed that the operation and use of the preferred embodiment of hay bale basket of the present invention will be evident from the foregoing description, a brief description thereof will follow.

In the field the hay bale basket 10 is hitched via the tongue 12 to the hay baler 14, the latter of which is hitched to the tractor 16. At this time the rear wall 20 of the basket 10 is in its latched shut condition as shown in solid in FIG. 2.

The entire combination is then moved through the field. The hay baler 14 picks up the mown hay, bales it and discharges the bales to the inlet 40 of the bale chute 38 as shown in FIG. 1. As the bales are discharged to the chute, they sequentially move up the chute until the leading bale H is discharged into the bale basket through the bale inlet opening 36 in the top front wall 18 of the basket 10. Due to the flared sidewalls 21 and 22, the bales H move into the basket easily and in an unimpaired fashion until the basket has been filled.

The filled basket 10 is now unhitched from the baler 14 and is ready for transport back to the location at which it is desired to deposit the bales. In this condition, the basket 10 is not only filled, but the chute 38 is also filled. The bales in the chute 38 are prevented from falling out of the chute by the latch 44 when the baler 14 is removed and during transport. Another tractor or truck may then be coupled to the tongue 12 for transport, while a second basket is hitched to the baler 14, if the baling operation is to be continued.

When the loaded bale basket 10 reaches its location of deposit, its rear wall 20 is positioned at the exact spot that it is desired to deposit the load of bales. At this time all that need be done is to actuate the cable actuating lever 76, either from the location shown in the drawings or from the tractor. When actuated, a tension will be drawn on cable 74 to permit the locking fingers 61 and 62 of the latching assembly 56 to move to their open position as shown in FIG. 6. They will be moved to their open position automatically due to the natural tendency of the inclined portion 20" of the rear wall 20 to cause the rear wall to swing open by gravity, and also due to the load of bales bearing against that wall. Thus, the pin 82, as shown in FIG. 6, will swing away from the latching assembly 56 and the rear wall will swing to its open position to dump the load of bales H from the basket. This dumping occurs rapidly without hang up or wedging of the bales in the basket or its wall openings due to the flare of the sidewalls 21 and 22.

When the bales have been dumped, the bale basket 10 is moved forward so as to clear the bales, and the rear wall 20 will swing with a pendulous motion by this movement until its pin 82 swings back to between the locking fingers 61 and 62. In the meantime the tension has been relieved on cable 74 and the motion of the pin 82 into position between the locking fingers will strike the cam surfaces 84 on the locking fingers to shut the fingers, as shown in FIG. 5, and latch the rear wall 20 in its shut position. The hay bale basket 10 is now ready for transport back to the field for another load of bales.

It will be understood that the embodiment of the present invention which has been described is merely illustrative of one of the applications of the principles of the invention. Numerous modifications may be made by those skilled in the art without departing from the true spirit and scope of the invention.

I claim:

1. A mobile basket for accumulating and transporting hay bales comprising:
   an axle adapted to support wheels for rotation thereon;
   a container mounted upon and supported by said axle for the transport of said container; said container having a front and a rear, and a pair of side walls which are spaced from each other, said side walls having a cage-like structure with openings of substantial size therethrough in which the bales tend to wedge during loading or discharge from the container;
   a bottom wall on said container which slopes upwardly from adjacent said axle toward the front of said container, said side walls extending upwardly from said bottom wall and the spacing of the side walls from each other at least adjacent the bottom wall being of sufficiently greater magnitude at the rear of said container than at the front thereof to prevent the bales from wedging in said openings of substantial size in the side walls when the bales are being loaded into or discharged from said container;
   an upwardly extending rear wall on said rear of said container having a top, said side walls, bottom wall and rear wall at least in part defining said container, and
   hinge means for hinging said rear wall toward its top to said container and such that said rear wall swings between a shut position to retain the bales in the container and an open position by gravity to discharge the bales from the container.

2. The mobile basket of claim 1, including an elongate chute mounted to the front of said container and sloping downwardly and forwardly therefrom, said chute having an inlet end positioned to receive bales from a hay baler and a discharge end positioned to discharge the bales in the chute to said container.

3. The mobile basket of claim 2, wherein said container has a front wall at said front and adjacent its top, and said chute is mounted to said front wall.

4. The mobile basket of claim 2, wherein said chute has latch means adjacent said inlet end to retain bales in said chute.

5. The mobile basket of claim 2, wherein said mobile basket includes a castor wheel mounted adjacent said front of said container.

6. The mobile basket of claim 2, including latch means adjacent said rear wall for latching it in said shut position, and latch operating means for unlatching said latch means from a location remote from said latch means to permit said rear wall to swing from said shut position to said open position about said hinge means.

7. The mobile basket of claim 6, wherein said latch means is positioned adjacent the bottom of said rear wall.

8. The mobile basket of claim 1, wherein said mobile basket includes a castor wheel mounted adjacent said front of said container.

9. The mobile basket of claim 1, including latch means adjacent said rear wall for latching said rear wall in said shut position, and latch operating means for unlatching said latch means from a location remote from said latch means to permit said rear wall to swing from said shut position to said open position about said hinge means.

10. The mobile basket of claim 9, wherein said latch means is positioned adjacent the bottom of said rear wall.

11. The mobile basket of claim 9, wherein at least a portion of said rear wall is inclined relative to the vertical when said rear wall is in said shut position, whereby said rear wall will swing to said open position by gravity about said hinge means when said latch means is unlatched, and will swing to said shut position and be latched therein by said latch means by movement of said mobile basket.

12. The mobile basket of claim 11, wherein the spacing between said upwardly extending side walls is greater at the rear of the container than at the front thereof substantially over the height of the side walls.

13. The mobile basket of claim 1, wherein at least a portion of said rear wall is inclined relative to the vertical when said rear wall is in said shut position, whereby said rear wall will swing to said open position by gravity about said hinge means.

14. The mobile basket of claim 1, wherein said side walls comprise a plurality of spaced parallel tubular members sloping upwardly from said rear wall toward said front of said container, the spacing between said tubular members defining said openings.

15. The mobile basket of claim 14, wherein said bottom wall also comprises a plurality of spaced parallel tubular members sloping upwardly from said axle toward said front of said container, the spacing between said tubular members defining openings of substantial size therein.

16. The mobile basket of claim 15, wherein the spacing between said upwardly extending side walls is greater at the rear of the container than at the front thereof substantially over the height of the side walls.

17. The mobile basket of claim 1, wherein said bottom wall also has a cage-like structure with openings of substantial size therethrough.

18. The mobile basket of claim 1, wherein the spacing between said upwardly extending side walls is greater at the rear of the container than at the front thereof substantially over the height of the side walls.

19. The mobile basket of claim 1, wherein said rear wall is non-planar so that at least a portion of said rear wall is inclined relative to the vertical when said rear wall is in said shut position, whereby said rear wall will swing about said hinge means to said open position and is biased toward said shut position by gravity.

20. A mobile basket for accumulating and transporting hay bales comprising:
- an axle adapted to support wheels for rotation thereon;
- a container mounted upon and supported by said axle for the transport of said container; said container having a front and a rear, and a pair of side walls with openings and which are spaced from each other;
- a bottom wall on said container which slopes upwardly from adjacent said axle toward the front of said container, said side walls extending upwardly from said bottom wall;
- a rear wall on said rear of said container, and having a top, said side walls, bottom wall and rear wall at least in part defining a container;
- hinge means for hinging said rear wall adjacent its top to said container and such that said rear wall swings between a shut position to retain the bales in the container and to an open position by gravity to discharge the bales from the container, said rear wall being non-planar so that at least a portion of said rear wall is inclined relative to the vertical when said rear wall is in said shut position, whereby said rear wall will swing about said hinge means to said open position by gravity and the weight of the bales and is biased toward said shut position by gravity.

21. The mobile basket of claim 20, including an elongate chute mounted to the front of said container and sloping downwardly and forwardly therefrom, said chute having an inlet end positioned to receive bales from a hay baler and a discharge end positioned to discharge the bales in the chute to said container.

22. The mobile basket of claim 21, wherein said container has a front wall at said front and adjacent its top, and said chute is mounted to said front wall.

23. The mobile basket of claim 20, including latch means adjacent said rear wall for latching said rear wall in said shut position, and latch operating means for unlatching said latch means from a location remote from said latch means to permit said rear wall to swing from said shut position to said open position about said hinge means.

24. The mobile basket of claim 23, wherein said latch means is positioned adjacent the bottom of said rear wall.

25. The mobile basket of claim 20, wherein said non-planar rear wall will also swing to said shut position and latch therein by said latch means by movement of said mobile basket.

* * * * *